(12) United States Patent
Gordon et al.

(10) Patent No.: US 11,580,714 B2
(45) Date of Patent: Feb. 14, 2023

(54) METHODS AND SYSTEMS FOR DISPLAYING VIRTUAL OBJECTS FROM AN AUGMENTED REALITY ENVIRONMENT ON A MULTIMEDIA DEVICE

(71) Applicant: Worldpay Limited, London (GB)

(72) Inventors: Kevin Gordon, Essex (GB); Charlotte Spender, Kent (GB)

(73) Assignee: Worldpay Limited, London (GB)

( * ) Notice: Subject to any disclaimer, the term of this patent is extended or adjusted under 35 U.S.C. 154(b) by 0 days.

(21) Appl. No.: 17/557,896

(22) Filed: Dec. 21, 2021

(65) Prior Publication Data

US 2022/0114798 A1    Apr. 14, 2022

Related U.S. Application Data

(63) Continuation of application No. 16/910,121, filed on Jun. 24, 2020, now Pat. No. 11,263,826, which is a continuation of application No. 16/847,998, filed on Apr. 14, 2020, now Pat. No. 11,250,642.

(51) Int. Cl.

| | |
|---|---|
| *G06T 19/20* | (2011.01) |
| *G06F 3/16* | (2006.01) |
| *G06F 3/0481* | (2022.01) |
| *G06T 19/00* | (2011.01) |
| *G06F 3/04883* | (2022.01) |
| *G06Q 20/12* | (2012.01) |
| *G06Q 30/06* | (2012.01) |
| *G06Q 30/0601* | (2023.01) |

(52) U.S. Cl.
CPC ............ *G06T 19/20* (2013.01); *G06F 3/0481* (2013.01); *G06F 3/04883* (2013.01); *G06F 3/167* (2013.01); *G06Q 20/123* (2013.01); *G06Q 30/0643* (2013.01); *G06T 19/006* (2013.01); *G06T 2200/24* (2013.01); *G06T 2219/2012* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 10,345,913 B2 | 7/2019 | Jain et al. | |
| 10,565,760 B2* | 2/2020 | Sullivan | .................. H04L 65/60 |
| 11,250,642 B1* | 2/2022 | Gordon | ................. G06T 19/006 |
| 2014/0300565 A1 | 10/2014 | Anderson et al. | |
| 2014/0333664 A1* | 11/2014 | Williams | ........... G06Q 30/0643 |
| | | | 345/633 |
| 2014/0364199 A1* | 12/2014 | Baerlocher | .......... G07F 17/3244 |
| | | | 463/25 |
| 2016/0026253 A1* | 1/2016 | Bradski | ................ H04N 13/128 |
| | | | 345/8 |
| 2017/0131964 A1* | 5/2017 | Baek | ...................... G06F 3/1462 |

(Continued)

*Primary Examiner* — Ryan M Gray

(74) *Attorney, Agent, or Firm* — Bookoff McAndrews, PLLC

(57) ABSTRACT

Methods and systems are disclosed for displaying an augmented reality virtual object on a multimedia device. One method comprises detecting, in an augmented reality environment displayed using a first device, a virtual object; detecting, within the augmented reality environment, a second device, the second device comprising a physical multimedia device; and generating, at the second device, a display comprising a representation of the virtual object.

20 Claims, 13 Drawing Sheets

(56) References Cited

U.S. PATENT DOCUMENTS

2018/0101994 A1\* 4/2018 Da Veiga ............ G06F 3/04812
2019/0333316 A1\* 10/2019 Nelson ................ G07F 17/3211
2020/0051527 A1\* 2/2020 Ngo ...................... G06F 3/1423

\* cited by examiner

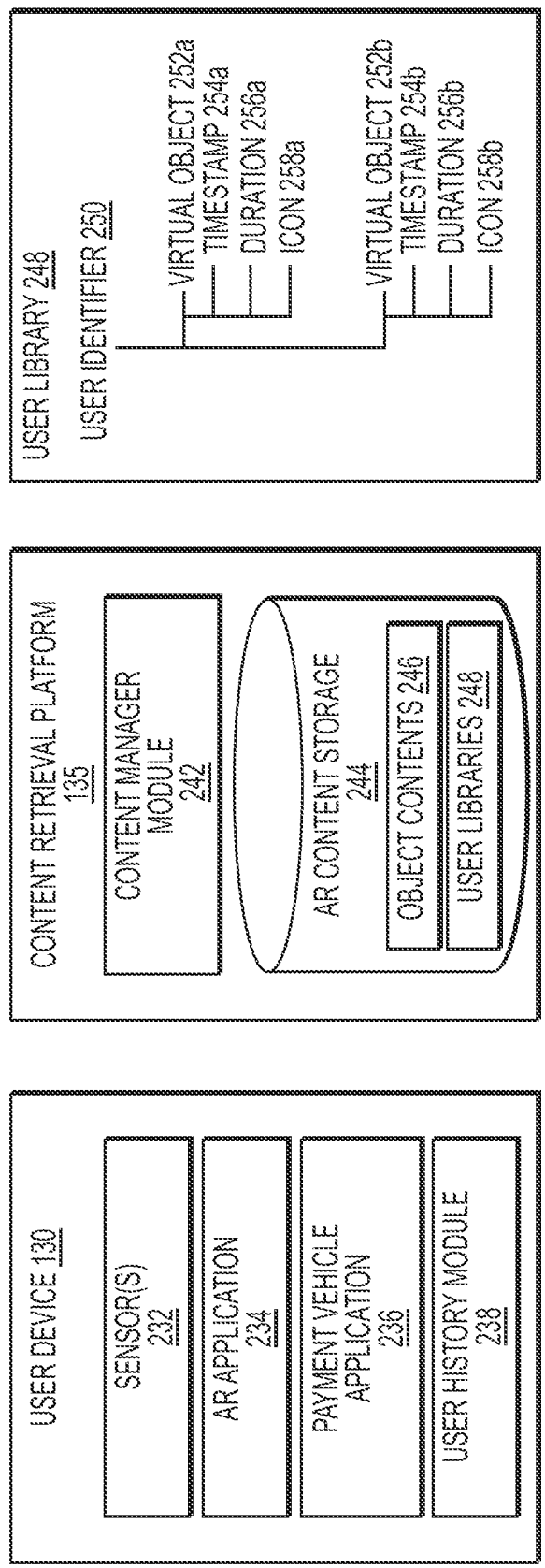

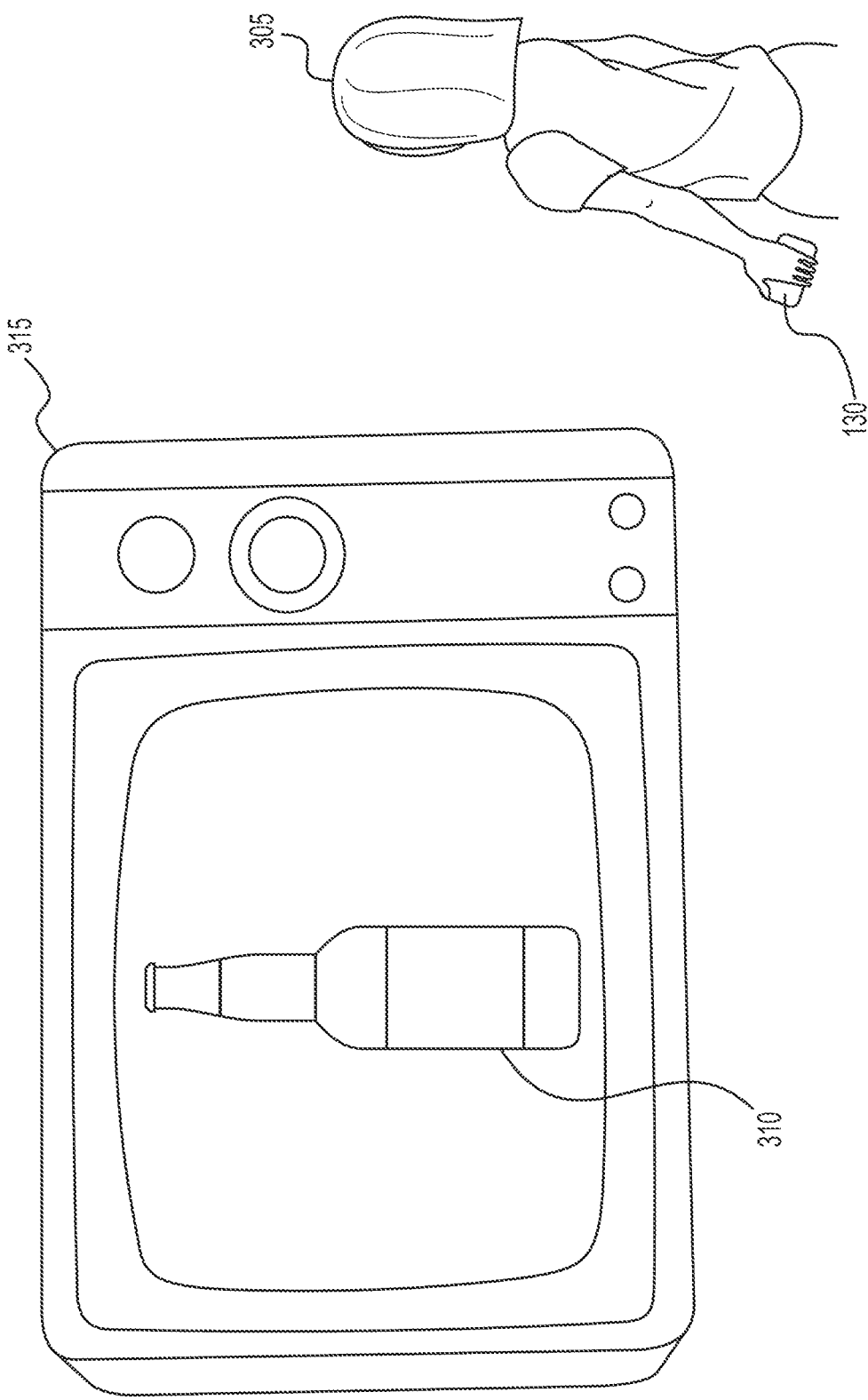

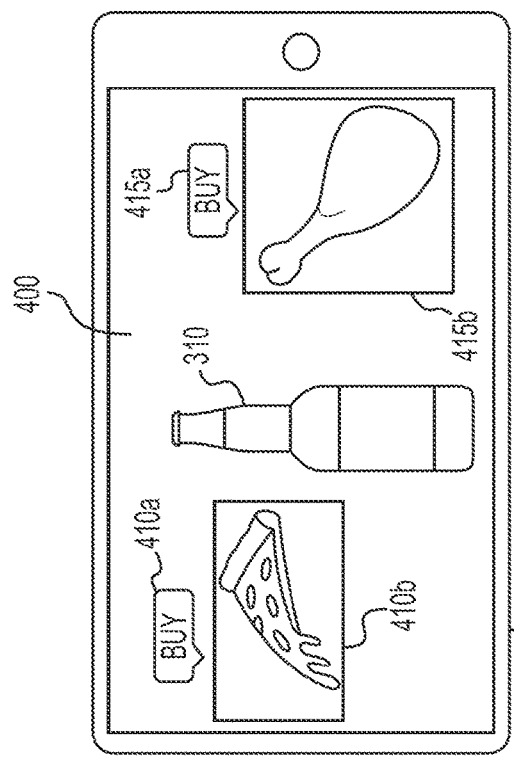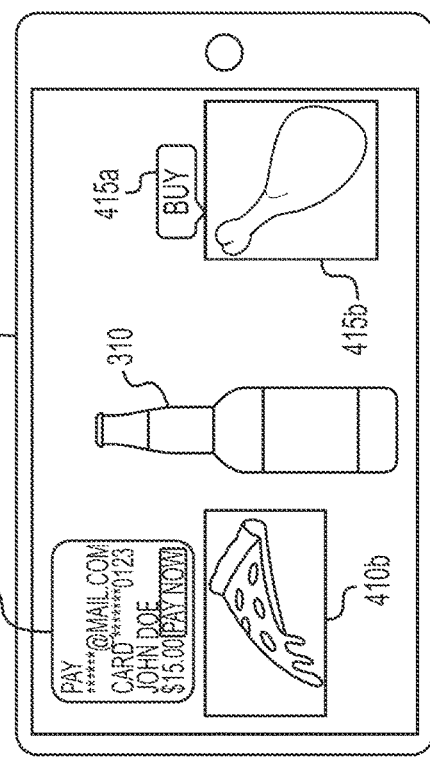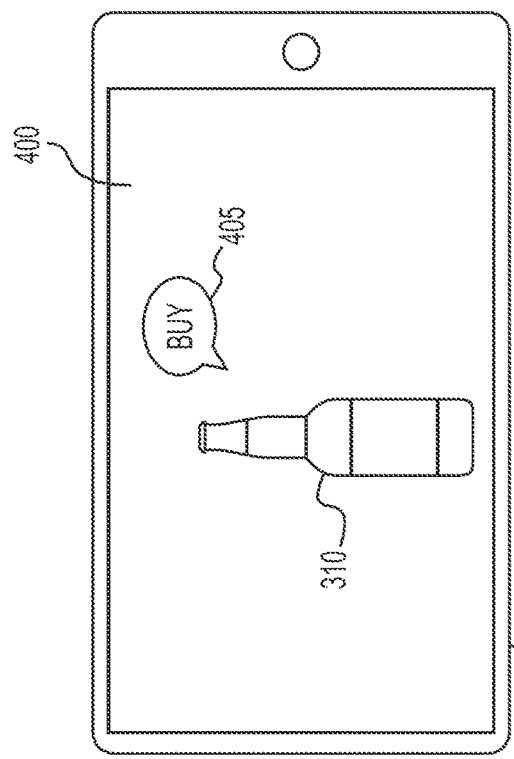

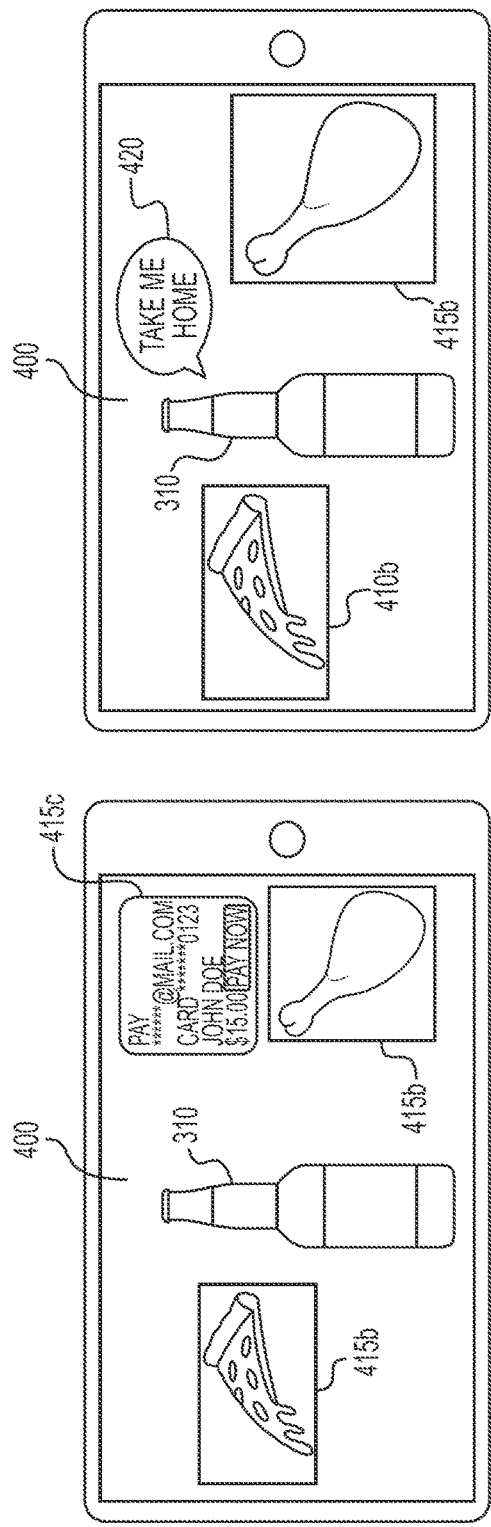
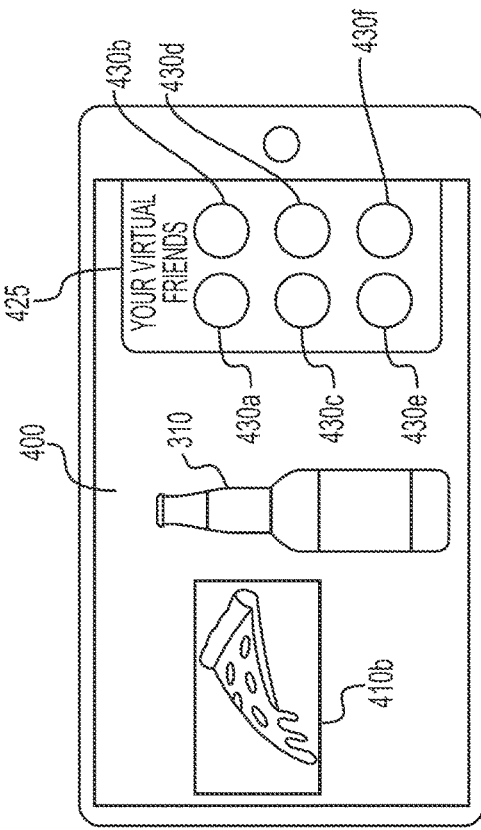

METHODS AND SYSTEMS FOR DISPLAYING VIRTUAL OBJECTS FROM AN AUGMENTED REALITY ENVIRONMENT ON A MULTIMEDIA DEVICE

CROSS-REFERENCE TO RELATED APPLICATIONS

This patent application is a continuation of and claims the benefit of priority to U.S. Non-provisional patent application Ser. No. 16/910,121, filed on Jun. 24, 2020, which claims the benefit of priority to U.S. Non-provisional patent application Ser. No. 16/847,998, filed on Apr. 14, 2020, the entirety of which is incorporated herein by reference.

TECHNICAL FIELD

Various embodiments of the present disclosure relate generally to augmented reality user interfaces. More particularly the present disclosure relates to presenting a virtual object from an augmented reality environment, onto a television set or other multimedia device. The present disclosure also relates to enabling electronic transactions at the various interfaces and devices.

BACKGROUND

Augmented reality is an area of growing interest and development. Augmented reality (AR) is the process of adding computer-supplied content, including images, video, text, and other data as layers over displayed images of the real world. For example, when a portable device captures an image or video of a scene including objects, one or more applications installed on the device can add information about the objects or other related contents over the displayed scene to enhance the user's experience. The user may utilize the overlaid information and contents to make informed decisions and/or for personal entertainment. At the same time, portable devices are increasingly able to cast their displays onto other multimedia devices, e.g., television sets, laptops, vehicles, projectors, etc.

A desire thus exists to bring augmented reality virtual content to more displays. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for displaying an augmented reality virtual object on a multimedia device, comprising: detecting, in an augmented reality environment displayed using a first device, a virtual object; detecting, within the augmented reality environment, a second device, the second device comprising a physical multimedia device; and generating, at the second device, a display comprising a representation of the virtual object.

One embodiment provides a system for displaying an augmented reality virtual object on a multimedia device. The system may comprise one or more processors; and a data storage comprising instructions which, when executed by the one or more processors, cause the one or more processors to perform a method comprising: detecting, in an augmented reality environment displayed using a first device, a virtual object; detecting, within the augmented reality environment, a second device, the second device comprising a physical multimedia device; and generating, at the second device, a display comprising a representation of the virtual object.

One embodiment provides a non-transitory computer readable medium for displaying an augmented reality virtual object on a multimedia device. The non-transitory computer readable medium may store instructions which, when executed by one or more processors, cause the one or more processors to perform a method comprising: detecting, in an augmented reality environment displayed using a first device, a virtual object; detecting, within the augmented reality environment, a second device, the second device comprising a physical multimedia device; and generating, at the second device, a display comprising a representation of the virtual object.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2A depicts an exemplary embodiment of a user device, according to one aspect of the present disclosure.

FIG. 2B depicts an exemplary embodiment of a content retrieval platform, according to one aspect of the present disclosure.

FIG. 2C depicts an exemplary embodiment of a user library, according to one aspect of the present disclosure.

FIGS. 3A-3C illustrates an exemplary context in which the techniques presented in the present disclosure may be used.

FIGS. 4A-4G depict exemplary graphical user interfaces (GUIs) presented by a user device for AR-enabled transaction and user collection of virtual objects.

DETAILED DESCRIPTION OF EMBODIMENTS

Figure 1:
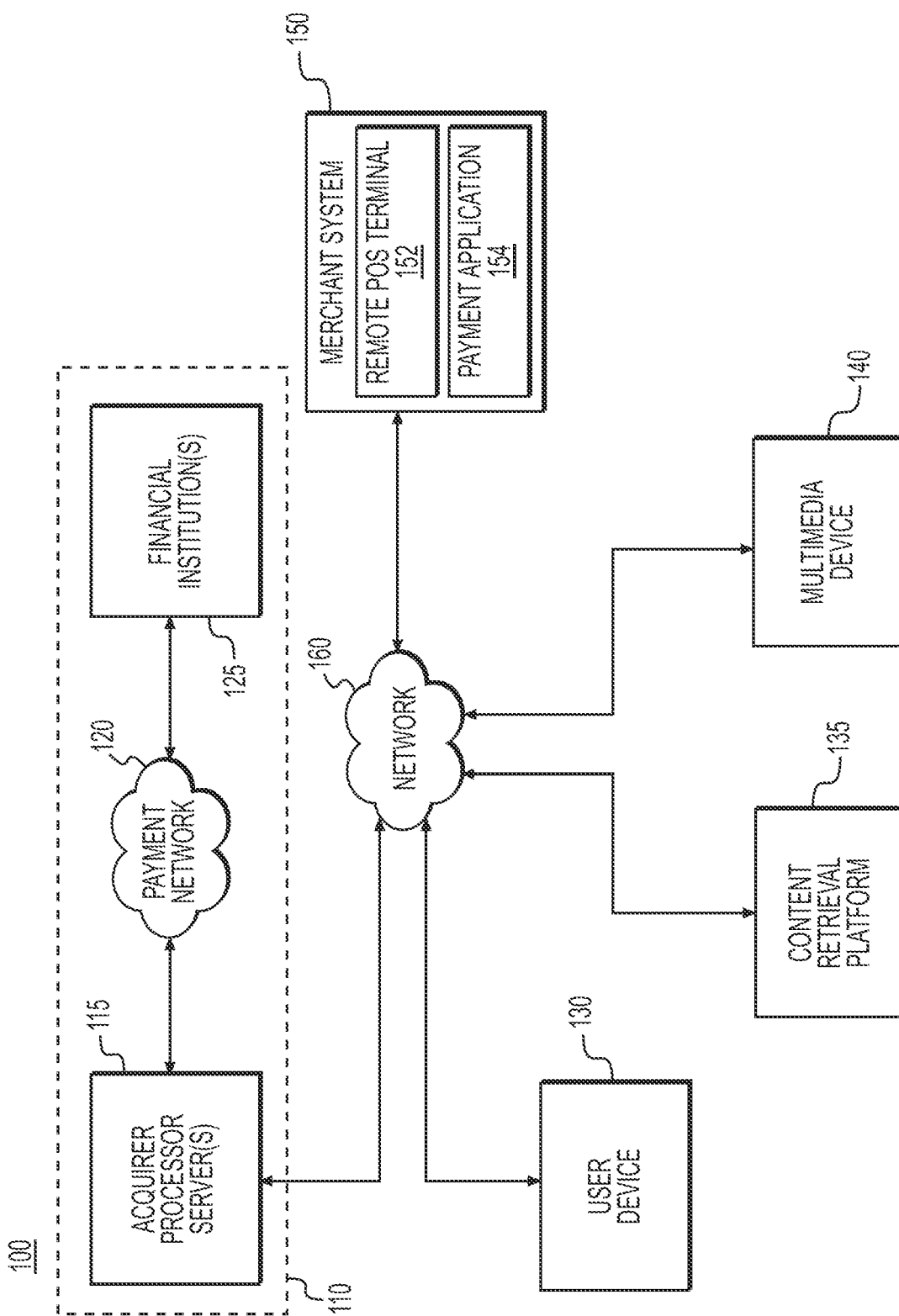
FIG. 1 depicts a block diagram of an augmented reality (AR)-enabled electronic transaction system, according to one aspect of the present disclosure.

Various embodiments of the present disclosure relate generally to augmented reality user interface and, more particularly, to enabling electronic transactions and presenting virtual objects across disparate augmented reality environments.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle," "transaction vehicle," or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

Traditionally, merchants and other store owners may accept payment/user authentication data (e.g., PIN, CVV, passcode, answer to a secret question, etc.) via point of sale (POS) devices that have buttons arranged in a standardized format of alphanumeric characters. The standardized format may be seen in standard PIN Pad and keyboard layouts. Authentication data that can be entered via PIN pads and keyboards comprise a sequence of alphanumeric characters (and special symbols in some cases). Authentication data of this nature may be easily detected by an observer, or may be stolen by a data thief hacking into a computer system storing such data. Entry or provision of such authentication data may be replicated by simply entering the stolen data using PIN pads, keyboards, etc.

Uses for augmented reality are rapidly being explored and developed. However, current augmented reality interfaces involve dedicated augmented reality services, platforms, mobile device apps, or devices. This means that augmented reality (AR) may not be readily accessible without special AR devices or device capabilities. At best, AR apps may be installed on user mobile devices. These mobile devices may then display AR user interfaces.

The disclosed systems and methods provide an improvement to the current viewing limitations of augmented reality experiences, by allowing virtual objects shown in augmented reality experiences, to be shown on other multimedia devices. For example, a user may select a virtual object from their augmented reality experience and opt to show the virtual object on their television set. In this way, the virtual object may be viewed by other users. For example, a user may view an augmented reality experience comprising an interior design of a room. An augmented reality view may display, within the physical room that a user may be in, virtual representations of furniture or décor. A user may then select, for instance, a couch from the augmented reality view for display on a physical television set in the room. The television set may then display a representation of the selected couch, for the user (and other people in the room) to view and examine.

For instance, the user may zoom in and out on the representation of the selected couch, opt to view different color options of the couch, rotate the couch, view different fabric/material options, etc. The display on the television set may be updated to reflect the user's actions (e.g., zooming, rotations, specification changes, etc.). The augmented reality display may also include an updated display showing the virtual object in accordance with the user's actions. The shared display between the augmented reality environment and the physical multimedia device (e.g., the television set) may be used to share an augmented reality experience with more than one user at a time. This sharing of the augmented reality experience could be used to facilitate business meetings or for entertainment. These interfaces may be useful for closer examination of virtual objects, or for any application where access to multiple screens and displays may be helpful.

In one embodiment, the augmented reality experience may be provided by an AR app installed on or accessed by a user device. The user device may include, for example, a personal mobile phone or wearable device. The physical multimedia device may include a television set, screen, or monitor. The user device may link to the physical multimedia device via any network, as discussed in greater detail at FIG. 1. A display of a virtual object on the physical multimedia device may be prompted by a user selection of the virtual object within the AR experience. The display may include a representation of the virtual object, as well as objects related to the virtual object, options related to the virtual object, or actions related to the virtual object. If a selected virtual object is a couch, for example, a related object may include a coffee table or end table. An option related to the couch may include a size configuration, material, or any other design details. An action related to the couch may include purchasing of the couch. For this instance, a display may include transaction specifications for purchase of the couch, e.g., price, weight, delivery information, color, geometric dimensions, promotional code(s), user review(s), warranty information, size information, user information, etc. Other actions may include display options, e.g., rotation, zooming in and out, etc. Additional actions may include modifications to a virtual object, for instance, truncating, cropping, replicating portions, inserting features (e.g., joints or sections), etc.

Referring now to the appended drawings, FIG. 1 depicts a block diagram of an AR-enabled electronic transaction system 100, according to one aspect of the present disclosure. In general, FIG. 1 depicts a payment environment 110, a user device 130, a content retrieval platform 135, a multimedia device 140, and a merchant system 150, all connected via network 160. Network 160 may include the Internet, but may also include other networks such as a corporate WAN, cellular network, satellite network, or combination thereof, for example. The network 160 may be employed to enable data communications between the various entities illustrated in FIG. 1.

In the AR-enabled electronic transaction system 100 of FIG. 1, the payment environment 110 may include acquirer processor server(s) 115 and financial institution(s) 125, connected via a payment network 120. Acquirer processor server(s) 115 may handle electronic transactions between the financial institution of the consumer and that of a merchant (e.g., at merchant system 150). For example, an acquirer processor server 115 may receive payment vehicle information and/or corresponding authentication data, which was collected by the merchant system 150. The acquirer processor server 115 may then request, by way of payment network 120, an electronic transfer of funds from a financial institution 125 associated with the payment vehicle and the user. The acquirer processor server 115 may also transfer the funds received from the user-related financial institution 125, to a financial institution 125 associated with the merchant system 150.

Figure 3A:
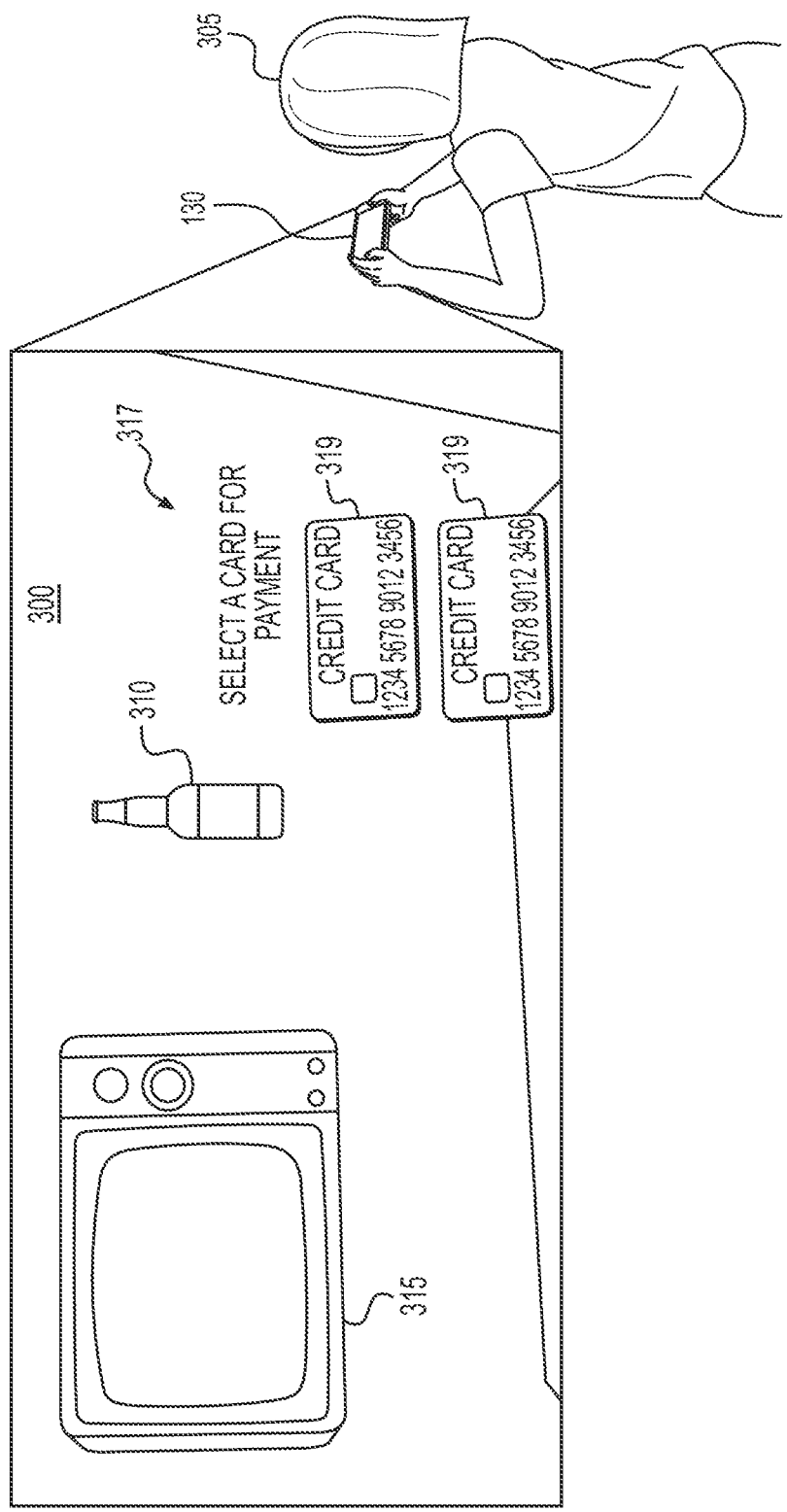

The user device 130 may include, but may not be limited to, an AR consumer product (e.g., an AR headset, an AR eyewear, etc.), a smartphone, a mobile phone, a tablet computer, a laptop, a portable computer, a desktop computer, a smart watch, a wearable device, etc. The user device 130 may comprise a computing device consistent with or similar to the computing system depicted in FIG. 9. The user device 130 may capture and display an environment including one or more objects, and may receive additional prompts from the content retrieval platform 135 to present objects over a displayed environment. The user device 130 may also be used to display an augmented reality environment. For example as shown in FIG. 3A, an augmented reality environment 300 may be displayed on user device 130. The augmented reality environment 300 may comprise a display shown to a user 305. The augmented reality environment 300 may include a virtual object, e.g., object 310, as well as a physical object 315. Physical object 315 may include any physical, tangible object in the physical, real environment of the user 305. For example, the physical object 315 may include a multimedia device 140. The physical object 315 may also be any other objects sharing a space with the user 305, e.g., a building, a couch, a table, a vehicle, etc.

The content retrieval platform 135 may detect or identify objects in the augmented reality environment displayed on user device 130. To detect objects in the augmented reality environment, content retrieval platform 135 may detect the user device 130 connected to network 160. Content retrieval platform 135 may also detect or be in communication with an augmented reality platform (not shown) providing the augmented reality content displayed on the user device 130. An augmented reality app (e.g., AR application 234 in FIG. 2A) may also provide augmented reality content displayed on the user device 130, and be in communication with content retrieval platform 135.

Alternately or in addition, content retrieval platform 135 may detect or receive content packages associated with the augmented reality content being played on the user device 130. In some cases, augmented reality platforms, services, and/or apps may provide content packages comprising information on objects related to the augmented reality displays. For example, for a given display, content retrieval platform 135 may receive a platform-provided package of virtual objects, each object tagged with a unique object identifier.

Alternately or in addition, content retrieval platform 135 may detect various virtual objects that were displayed by an augmented reality platform, e.g., via image recognition. Content retrieval platform 135 may then identify object identifiers associated with the recognized virtual objects. In some cases, virtual representations of the virtual objects may be retrieved using the identified object identifiers. For example, content retrieval platform 135 may access databases or storage entities to retrieve representations of the virtual objects, based on their object identifiers. The representations may include a 3D model, 2D image, schematic drawing, text description, icon, or any depiction of the virtual object. In some cases, the databases or storage entities may be associated with or provided by merchant system 150. In other scenarios, the databases or storage entities may be any repository storing visualizations of one or more virtual objects. The visualizations may be directly tagged with the object identifiers, or with any codes linked to the object identifiers.

Figure 3B:
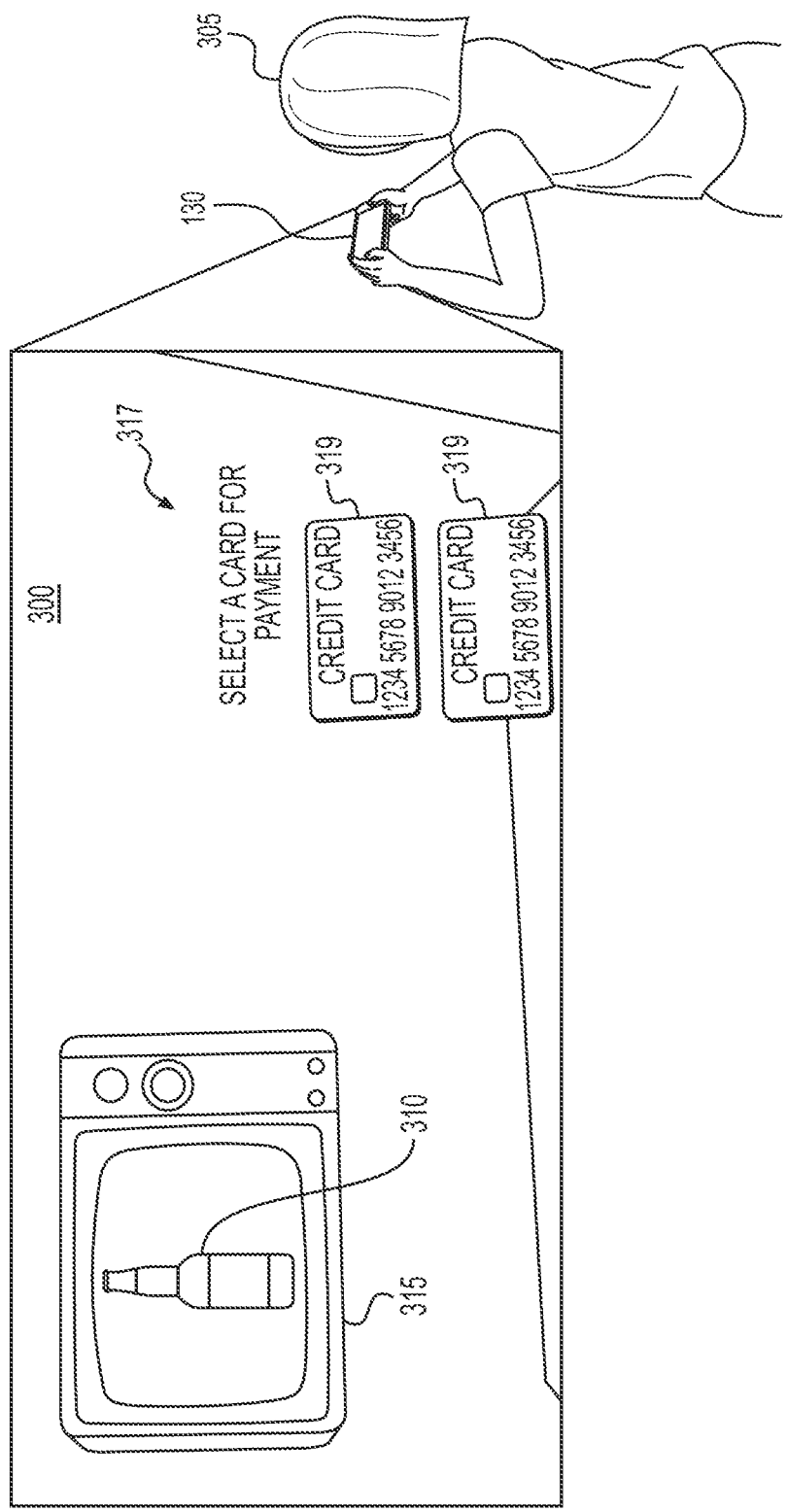

The content retrieval platform 135 may further detect various content that could augment the scene or environment displayed by the user device 130. For example, content retrieval platform 135 may provide payment interfaces or features for purchasing the virtual objects or items related to the virtual objects. FIGS. 3A and 3B include exemplary payment features, including a prompt 317 for a payment transaction and a selection of payment vehicles 319 for a user to complete a transaction.

An electronic payment interface may be provided in various formats, including augmented reality environments.

In one embodiment, an electronic payment interface may be a web page where a user can provide payment vehicle information as well as the corresponding authentication data (e.g., PIN, password, CVV, answer to a secret question, biometric data, etc.). In another embodiment, an electronic payment interface may be a web-based application through which a user can provide a payment vehicle (or payment vehicle information) as well as the corresponding authentication data. In another embodiment, an electronic payment interface may entail a mobile application, e.g., installed on a user device 130. The mobile application may provide access to an electronic payment interface for a user to enter payment vehicle information and/or authentication data. Yet another electronic payment interface may include a display of the multimedia device 140. For example, content retrieval platform 135 may prompt at least a portion of an electronic payment interface to be shown on a TV screen of a television multimedia device 140. The electronic payment interface may include augmented reality or virtual reality interfaces, elements, or features. The content retrieval platform 135 may comprise a computing system consistent with, or similar to, that depicted in FIG. 9.

In one embodiment, the content retrieval platform 135 may maintain a stored collection of objects. For each object, content retrieval platform 135 may have saved, at least one object identifier, and any specifications related to the object, e.g., weight, price, delivery information, promotional code(s), user review(s), image(s) of the object, size information, use information, material composition, nutritional information, dosage, serving size, ingredient information, warnings, warranty information, related products/objects, or a combination thereof. The content retrieval platform 135 may manage the stored objects via content manager module 242 and store the object specifications and/or virtual representations of the virtual objects via AR content storage 244. Both the content manager module 242 and AR content storage 244 are described in more detail at FIG. 2B.

The content retrieval platform 135 may also store one or more user libraries comprising virtual objects and/or icons corresponding to the virtual objects. Each user library may be associated with a respective user and comprise one or more virtual objects that have been displayed to the user. An instance of a user library 248 is described in more detail at FIG. 2C.

The multimedia device 140 may include any home entertainment device, including a television set, speaker, projector, stereo, gaming device, etc. As shown in FIG. 3B, a user may select a given virtual object 310 from an augmented reality environment 300 by "grabbing" or "dragging" the virtual object 310 from its original position in the augmented reality environment 300. In some cases, the user may indicate their selection by "dragging" the virtual object 310 onto the showing of the physical object 315 (e.g., multimedia device 140) in the augmented reality environment 300. This overlay of the virtual object 310 on the physical object 315 may indicate the user's desire to display the virtual object 310 at the physical object 315. As shown by FIG. 3C, a display of the virtual object 310 may then be provided at the physical, multimedia device 140 (outside of the augmented reality environment 300). In other words, at FIG. 3C, a multimedia device 140 (for instance a user's television set) may show a representation of the virtual object 310 from the augmented reality environment 300. In this way, even users outside of the augmented reality environment 300 can view virtual object 310. User 305 may perform this operation to share parts of their augmented reality experience with other users in their physical space, or to better view and interact with the virtual object 310.

A user may also select a virtual object 310 for display by framing a physical object 315/multimedia device 140 in their user device 130 frame, and tapping or double-tapping on the virtual object 310. In such an embodiment, the physical object 315 may not be part of the augmented reality environment 300, for the virtual object 310 to be displayed on the physical object 315. In another embodiment, user device 130 and multimedia device 140 may be linked via network 160, e.g., by a Bluetooth or WiFi connection. Once the connection is established, a selected virtual object 310 may be displayed on the multimedia device 140 linked to the user device 130.

The merchant system 150 may include a remote point of service (POS) terminal 152 and/or a payment application 154. The POS terminal 152 and payment application 154 may both be used to collect payment vehicle information, payment credentials, and/or payment authentication information. The merchant system may send a transaction authorization request by way of the network 160 to an acquirer processor server 115. The acquirer processor server 115 may then fulfill the transaction authorization request by verifying the payment vehicle information, payment credentials, and/or payment authentication information, and prompting a transfer of funds for payment. The remote POS terminal 152 of the merchant system 150 may be in communication with the user device 130 over the network 160. In some embodiments, the merchant system 150 may provide or prompt an electronic payment interface to be displayed at the user device 130, e.g., using payment application 154.

Figure 9:
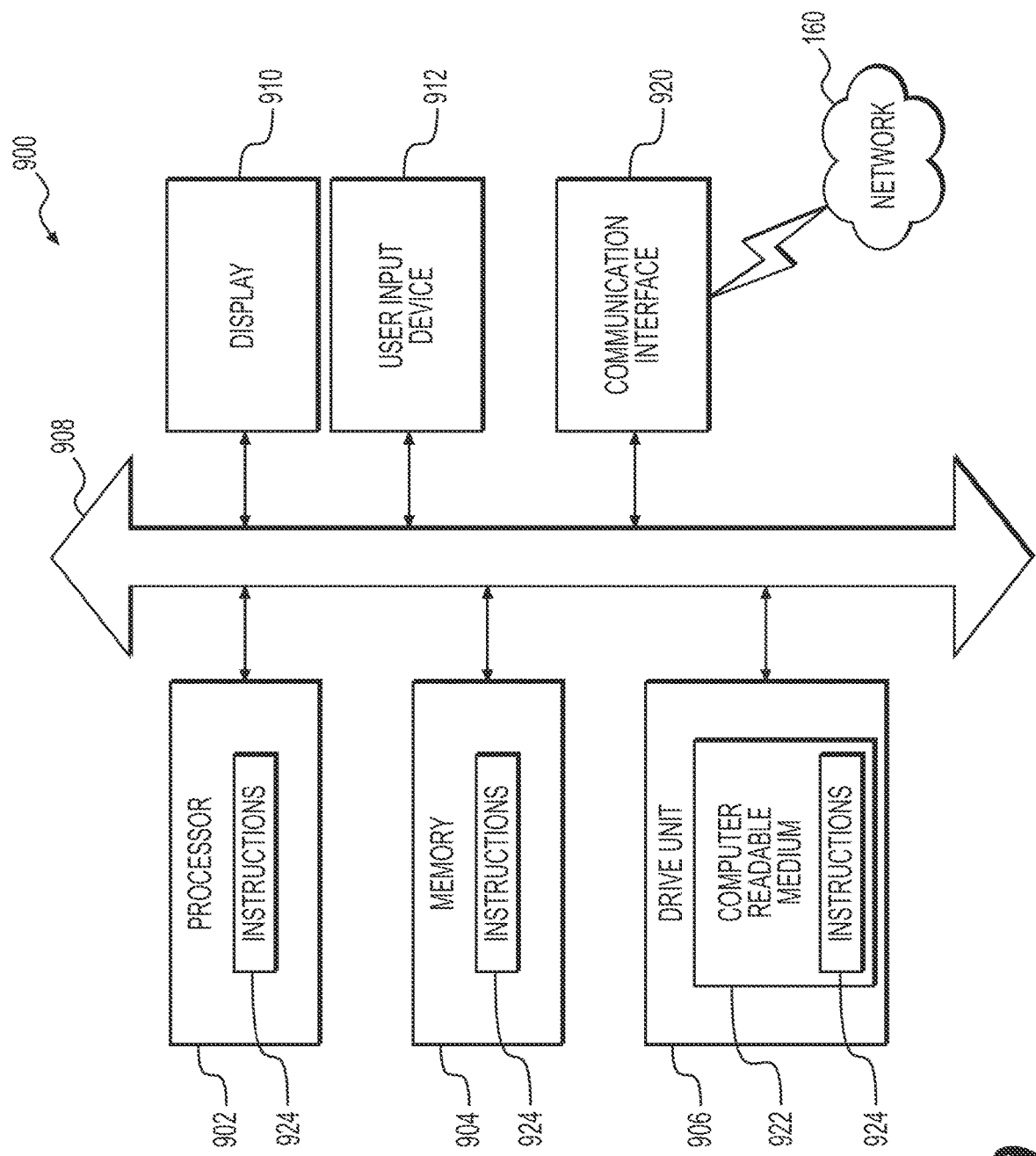
FIG. 9 illustrates an implementation of a computer system that may execute techniques presented herein.

It should be noted that, although the user device 130, content retrieval platform 135, multimedia device 140, and merchant system 150, are shown as separate entities in FIG. 1, all or a portion of these components (and the steps performed thereof) may be implemented in a single computing device consistent with or similar to that depicted in FIG. 9. The configurations specifically discussed herein regarding the arrangement of the components depicted in FIG. 1 are merely exemplary, and it would be obvious to a person of ordinary skill in the relevant art that different combinations of components may be implemented on a single or multiple computing devices.

FIG. 2A depicts an exemplary embodiment of a user device 130 according to one aspect of the present disclosure. As alluded to above, the user device 130 may be a computing device consistent with or similar to that depicted in FIG. 9. In addition, the user device 130 may comprise sensor(s) 232, an augmented reality (AR) application 234, a payment vehicle application 236, and a user history module 238.

The sensor(s) 232 may include global positioning system (GPS) sensors, vision sensors (i.e., cameras), audio sensors (i.e., microphones), light sensors, touch sensors, temperature sensors, radio frequency sensors, direction sensors (i.e., magnetic compasses, magnetometers, gyroscopes), and acceleration sensors (i.e., accelerometers). In one embodiment, the content retrieval platform 135 may detect objects using input received from sensors 232, e.g., audio or image-based input. The input may indicate an item selection of an object or a selection to manipulate an object. Exemplary manipulations may include rotating, zooming in and out, changing color (e.g., highlighting), changing dimensions, purchasing the object, searching for objects related to the selected object, etc. User input detected by sensors 232 may also cause content retrieval platform 135 to initialize object detection or retrieval. For example, a user may motion with their user device 130 and the motion may be captured via the direction and acceleration sensors 232 of the user device 130. Based on the motion, the content retrieval platform 135 may detect object selection by a user and prompt display of the selected object at the multimedia device 140.

The AR Application 234 may be a single application or a group of applications configured to collect various contextual data using one or more sensors 232 of the user device 130, process the collected contextual data, and provide an AR experience to the user based on the processed contextual data. For example, using a camera of the user device 130, the AR application 234 may receive a visual input that represents the real physical environment, and the content retrieval platform 135 may identify objects in the AR environment or receive data/tags about objects in the AR environment.

The AR application 234 may receive contextual data from sensors of the user device 130, such as, e.g., the GPS sensor, accelerometer, and gyroscope, in order to determine the location, distance, angle, and/or motion of the identified objects relative to the camera of the user device 130, or the location, distance, angle, and/or motion of the camera of the user device 130 relative to the identified objects. Data comprising the determined location, distance, angle, and/or motion may be referred to as location and orientation data in the present disclosure. The AR application 234 may then use the location and orientation data to adjust the size, orientation, and/or placement of virtual contents over the real environment displayed in the user device 130. The AR application 234 may then overlay or superimpose the virtual contents over the displayed environment based on the adjusted parameters.

In one instance, the content retrieval platform 135 may detect and retrieve virtual objects from content conveyed via the AR application 234 of the user device 130, and prompt a display of the virtual object on the multimedia device 140. User interactions with the virtual objects may be received as input via the sensors 232, e.g., zooming, minimizing, dragging, or rotating the virtual objects. The content retrieval platform 135 and the AR application 234 may then work in conjunction to update the display, in response to the user input. For example, the content retrieval platform 135 may retrieve, find, or generate additional views of the objects, according to the user input, and the AR application 234 may display the views.

The AR application 234 and content retrieval platform 135 may further cast or project the AR application to generate a display on the multimedia device 140, where the display may be controlled via inputs at the user device 130. For example, the user may zoom or rotate a virtual object on a touchscreen of their user device 130, and the AR application 234 may allow the zooming or rotation manipulation of the virtual object to be shown at the user device 130 screen and/or at the multimedia device 140. The displays may include full-screen displays, partial displays, overlays, pop-ups, taskbars, windows, or any combination thereof.

The payment vehicle application 236 may provide security and encryption (e.g., tokenization, etc.) for personal information needed for electronic transactions. For example, the payment vehicle application 236 may comprise digital wallet systems such as GOOGLE PAY, APPLE PAY, SAMSUNG PAY, PAYPAL, VENMO, etc. In one embodiment and as shown in FIG. 2A, the payment vehicle application 236 may be stored on the client side (i.e. user device 130) and may be fully compatible with electronic commerce websites (i.e., merchant websites). In some embodiments, the payment vehicle application 236 may be on the server side, and may be one that a merchant or an organization creates for/about a user and maintains on its server(s). The personal information retained by the payment vehicle application 236 may comprise a shipping address, a billing address, payment methods, account numbers, expiration dates, security numbers and answers, and any other information needed for authenticating an electronic transaction.

The user history module 238 may include a stored information on objects stored by the user, as well as the user's transaction or purchase history. For example, the user history module 238 may store a collection of icons for each TV/radio-derived object selected and stored by a user. These icons may be accessed by a user at a later date, either in augmented reality interfaces, additional payment/purchase scenarios, or just for reference. The icons may further be shared via social media or from one user device to another user device, e.g., via text messages. The user history module 238 may include a user library 248, as described below.

FIG. 2B depicts an exemplary embodiment of a content retrieval platform 135, according to one aspect of the present disclosure. In one embodiment, content retrieval platform may include a content manager module 242 and an AR content storage 244. In one embodiment, content manager module 242 may manage tags and identifiers of any objects stored in AR content storage 244. AR content storage 244 may include a collection of predetermined objects, e.g., a listing of selectable virtual objects shown via AR application 234.

The content manager module 242 may also perform or prompt object detection techniques to detect objects shown by AR application 234. Object detection techniques may include, for example, machine learning methods, speech recognition, sound recognition, image recognition, a library of predetermined objects, a sponsored object listing, previous transaction history associated with a user, or a combination thereof. Exemplary machine learning techniques may include natural language processing (NLP), text classifiers, image recognition classifiers, deep learning, convolutional neural networks, You Only Look Once (YOLO), regression problems, random forest, etc., using unsupervised machine learning such as cluster algorithms, principal component analysis (PCA), etc., reinforcement learning, or any models for detecting objects in visual contents/files, such as documents, images, pictures, drawings, media files, etc.

As one example, content manager module 242 may use a convolutional neural network (CNN) for object detection. For example, image data may be input into the CNN and passed through various convolutional layers and pooling layers. In one embodiment, the content manager module 242 may employ a CNN, which may apply a series of filters to the raw pixel data of the image to extract and learn higher-level features, which the model may then use for classification. The CNN may be composed of a stack of convolutional modules that perform feature extraction, with each module consisting of a convolutional layer followed by a pooling layer. The last convolutional module may be followed by one or more dense layers that perform classification. The types of the CNN which can be implemented with the embodiments contemplated herein may include a region-based CNN (RCNN), fast RCNN, and faster RCNN. Any currently-known or later-developed object detection techniques may be used to identify the objects in a multimedia content. The content manager module 242 may store any detected objects using the AR content storage 244.

The content manager module 242 may also retrieve or generate a virtual version of a virtual object. For example, content manager module 242 may retrieve an image file from the AR content storage 244, based on an object identifier. The content manager module 242 may also generate or prompt an interface viewable from an augmented reality app installed on a user device 130.

The AR content storage 244 may store object contents 246, which may comprise virtual objects corresponding to the objects shown by the AR application 234 of the user device 130, as well as detailed and/or related information pertaining to the virtual objects. The AR content storage 244 may also store one or more user libraries 248 comprising virtual objects and/or icons corresponding to the virtual objects, each user library being associated with a respective user and comprising one or more virtual objects that belong to the user.

FIG. 2C depicts an exemplary embodiment of a user library 248 according to one aspect of the present disclosure. As shown in FIG. 2C, each user library 248 may be a data structure storing a user identifier 250 in association with one or more virtual objects 252a, 252b that belong to the user. Each user library 248 may thus be associated with a user identifier 250 of the corresponding user. The content retrieval platform 135 (e.g., the content manager module 242) may be configured to search for a library of virtual objects that belong to a particular user, using the user identifier of that user. Further, each virtual object (252a or 252b) stored in the user library 248 may in turn be associated with a timestamp (254a or 254b), a duration (256a or 256b), and a corresponding icon (258a or 258b). The entire user library, or one or more virtual objects and/or icons contained in the user library may then be returned to the AR application 234 of the user device 130. The virtual object(s) and corresponding icon(s) may then be stored in association with the user identifier in a local storage of the user device 130. The virtual object(s) and corresponding icon(s) stored at the user device 130 may thus resemble the user library 248. In other words, the data stored in the local storage of the user device 130 may be in sync with the user library 248.

FIGS. 3A-3C depict an exemplary usage of the content retrieval platform 135 to render virtual objects in real-world settings. For example as shown by FIG. 3A, a user 305 may view a virtual object 310 in an augmented reality environment 300 displayed on a user device 130. The augmented reality environment 300 may display the virtual object 310, as well as a physical object 315 comprising a multimedia device 140. The user 305 may then opt to display an image of the virtual object 310 on their multimedia device 140 by selecting the virtual object 310. FIG. 3B illustrates an embodiment in which selection of virtual object 310 comprises dragging the virtual object 310 until it overlays physical object 315. However, object selection may include any gesture, e.g., swiping, clicking, double-clicking, touching, tapping, grabbing, or pinching the depiction of virtual object 310 on a user interface of user device 130. Object selection may also include voice or sound commands, motioning using the entire user device 130 (e.g., flipping, shaking, or rotating the user device 130), cues from a controller or other device connected to the user device, etc. As shown by FIG. 3C, upon selection of the virtual object 310, a representation of the virtual object 310 may be shown on the physical object 315/multimedia device 140. The display at the multimedia device 140 may include any portion of the AR environment 300 shown on the user device 130, one or more selected virtual objects 310, as well as information related to any selected virtual objects 310.

The display at the multimedia device 140 may also include any manipulations of the representation of the virtual object 310. For example, a user may perform manipulations of the virtual object 310 at the user device 130, and the manipulations may be reflected in an updated display at the multimedia device 140 (and/or the user device 130). Exemplary manipulations may include rotating, zooming, changing color, or changing size of the virtual object 310. The updated display may then reflect the manipulation. For example, if a user rotates a virtual object 310 90° in the screen of their user device 130, the representation of the virtual object 310 at the multimedia device 140 may show the virtual object 310 rotated 90° from its original position.

FIGS. 4A-4G depict exemplary graphical user interfaces (GUIs) presented by the user device 130 for AR-enabled display and purchase of objects from multimedia streams. The GUIs of FIGS. 4A-4G may be rendered by the content retrieval platform 135 identifying objects from the multimedia device 140, and working in conjunction with the user device 130 and merchant system 150.

FIG. 4A depicts an exemplary interface 400, in which a virtual object 310 from an AR environment on a user device 130, may be displayed on a multimedia device 140. For example, object 310 may be displayed as an image on interface 400. Interface 400 is illustrated in the following figures as an interface on a user device 130, but interface 400 may also comprise a display on a physical multimedia device 140. In some embodiments, certain features of interface 400 may be displayed on user device 130 and other features of interface 400 may be displayed on a physical multimedia device 140. For example, in one scenario, objects related to virtual object 310 may be displayed on both user device 130 and multimedia device 140, while selection options (described in further detail below) or payment authentication commands may be displayed only on user device 130.

The interface 400 may include a selection option 405, e.g., for a user to purchase the object 310. The selection option 405 may include a button or tab with a caption, e.g., "BUY." Upon detecting selection of user selection of the button or tab, payment vehicle application 236 compatible with the remote POS terminal 152 may be initiated.

As shown in FIG. 4B, the object 310 may further be displayed on interface 400 with related content and corresponding selection options, e.g., a first purchase selection option 410a with a first related object 410b, and a second purchase selection option 415a with a second related object 415b. FIG. 4C shows an exemplary transaction interface 410c and FIG. 4D shows an exemplary transaction interface 415c. Transaction interfaces 410c and/or 415c may overlay or accompany a user device interface 400. In one scenario, transaction interfaces 410c and/or 415c may be displayed after receipt of user input selecting a purchase selection option, e.g., selection option 410a (from FIG. 4B). The transaction interfaces 410c and/or 415c may include user payment credentials and a confirmation request, e.g., an input button with a caption reading, "pay now" or "confirm payment." Upon the user selecting the input button, the AR application 234 may, by way of the payment vehicle application 236, transmit the transaction information to the merchant system 150 (or the remote POS terminal 152 of the merchant system 150). The merchant system 150 may then generate a transaction authorization request based on the received transaction information, and transmit the transaction authorization request to an acquirer processor server 115.

In some cases, transaction interfaces 410c and/or 415c may also be confirmed or modified. For example, transaction interfaces 410c and/or 415c may include an option or prompt for user 305 to confirm/modify the displayed transaction information (e.g., user information comprising user name, user ID, payment account number, etc., which may be retained by the payment vehicle application 236 securely, transaction amount, etc.) and complete a payment in a more convenient and prompt manner. FIG. 4E includes a display which may include option 420 to purchase a package of objects, e.g., virtual object 310, related object 410b, and related object 415b.

FIG. 4F presents a display having an exemplary user history menu 425 of previously collected or purchased items of the user. Icons or images of previously selected or purchased objects from a multimedia stream may be displayed in positions 430a-430e. The user history menu 425 may comprise a side pane or side bar. Menu 425 may appear briefly to confirm selection or purchase by showing an image of the object 310 (along with icon(s) representative of any other virtual object(s) that have been selected/purchased by the user 305). Menu 425 may also fold or scroll into a tab or minimized icon, so as not to obstruct the entire screen view. The tab or minimized icon may permit a user to re-open, expand, or display the menu 425, in response to user input. Exemplary user input may include touching or swiping the tab or minimized icon, which the user 305 can touch and swipe to the other side to re-open/expand the side pane menu 425. The menu 425 may also permit a user to delete or clear icons from the display.

Purchase information or related objects may be derived from the previously collected or purchased items displayed in user history menu 425. In some cases, content manager module 242 may receive a search request and determine, for a user, whether a selected item for purchase has previously been purchased, e.g., by using a user library 248. If so, the user history menu 425 may simply refresh or update a prior entry/display. If the object was not previously purchased, content manager module 242 may provide an icon or image to be used in future displays of menu 425.

Figure 4G:
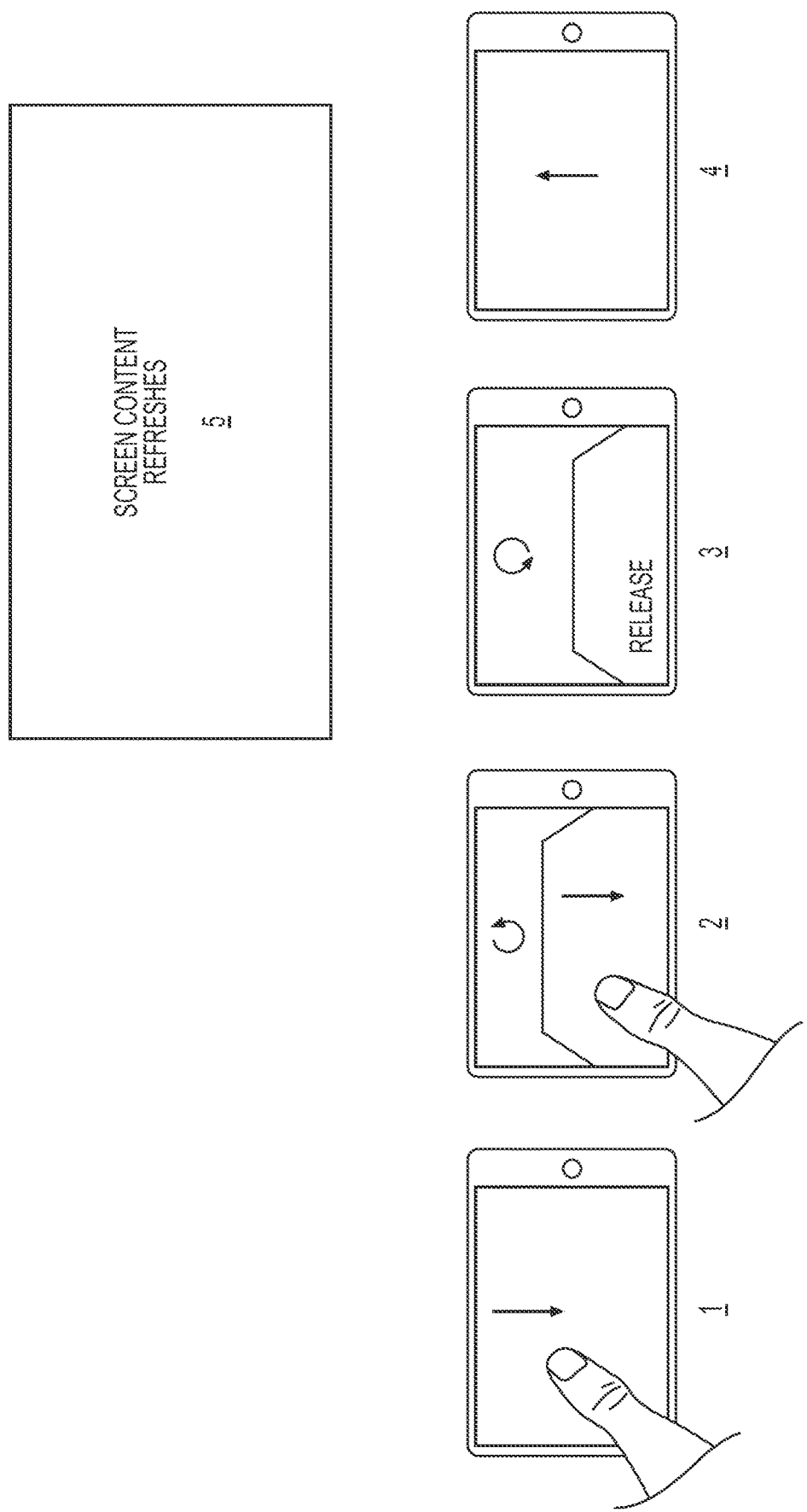

FIG. 4G presents an exemplary pairing of user interfaces between a user device and a separate screen display. In the example at FIG. 4G, a drag-and-release motion may prompt a display refresh or clear-screen command at a user device, e.g., user device 130. The display refresh or clearing of a screen command at the user device 130 may prompt a reciprocal clear-screen/clear-display action at a different device or screen paired to the user device 130. For example, a display at a multimedia device 140 may return to a blank screen after a user makes a drag-and-release motion at their user device 130. FIG. 4G illustrates a user making a dragging motion across a user device screen (e.g., as shown in panels 1 and 2) and a release motion (shown at panel 3). Panel 4 shows a blank screen, illustrating a refreshed or cleared display. This display may be devoid of any virtual objects, as shown at panel 4. A remote screen (e.g., panel 5) may also refresh to a blank display. The remote screen may be comprised of a display at multimedia device 140.

While FIG. 4G describes a display refresh as returning a screen to a blank state, a refresh may also return a virtual object representation to its initial state, prior to any user manipulations, or "undo" one or more manipulations. Motions or commands in addition to drag-and-release may initiate screen refreshes between a user device 130 and multimedia device 140. For example, a user may select a "clear screen" or "delete" prompt (not shown), use a voice command, "shake" their user device 130, or use any variety of predetermined gestures, audio, motion, or prompts to reset a screen.

Figure 5B:
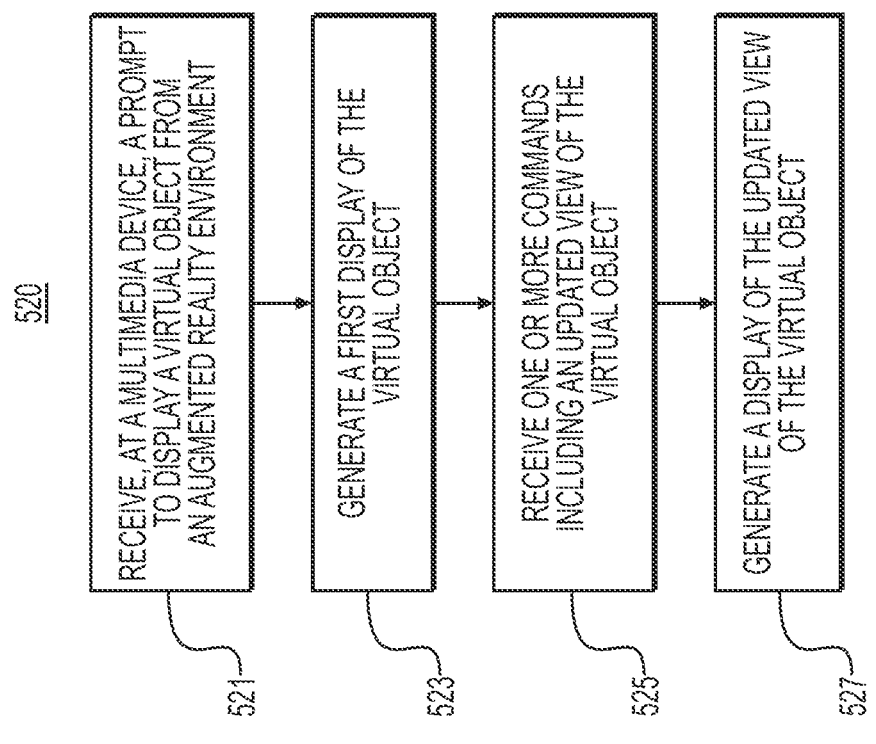
FIG. 5B is a flowchart of an exemplary method of a multimedia device generating a display based on a prompt from a user device, according to one aspect of the present disclosure.
Figure 5A:
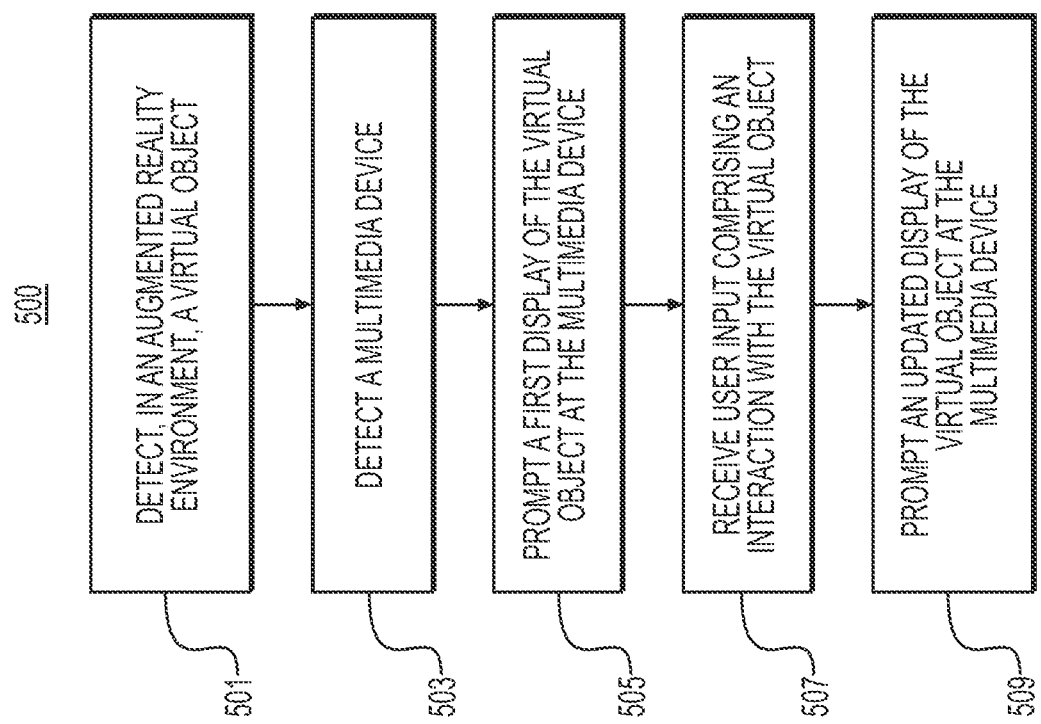
FIG. 5A is a flowchart of an exemplary method of a user device prompting a display at a multimedia device, according to one aspect of the present disclosure.
Figure 6:
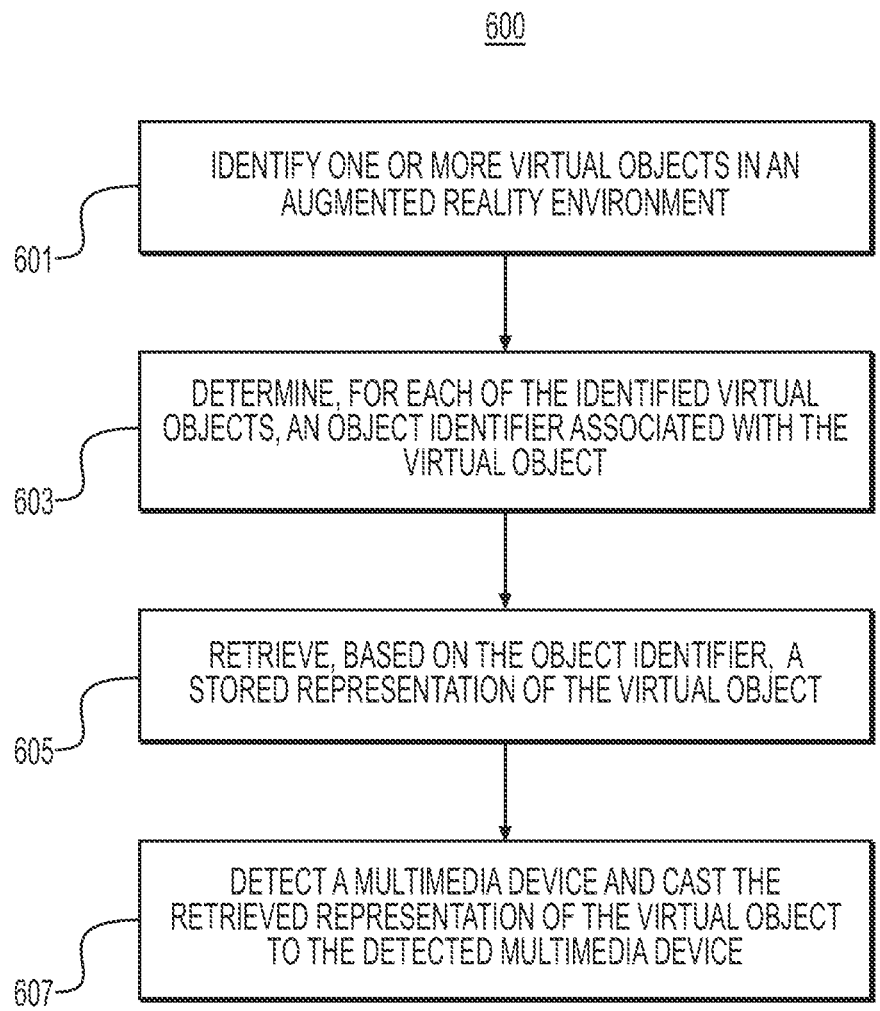
FIG. 6 is a flowchart of an exemplary method of retrieving or generating content for displaying a virtual object at a multimedia device, according to one aspect of the present disclosure.

As previously discussed, the disclosed embodiments may allow for a more fluid use experience between personal user devices and a shared multimedia device. FIG. 5A is a flowchart of an exemplary method of enabling a user device (or content retrieval platform) to depict a virtual object from an AR display, at multimedia device. FIG. 5B is a depicts an exemplary method of enabling a multimedia device (or content retrieval platform) to display a virtual object received from an AR environment. FIG. 6 includes an exemplary method of creating a display of a virtual object.

Figure 7:
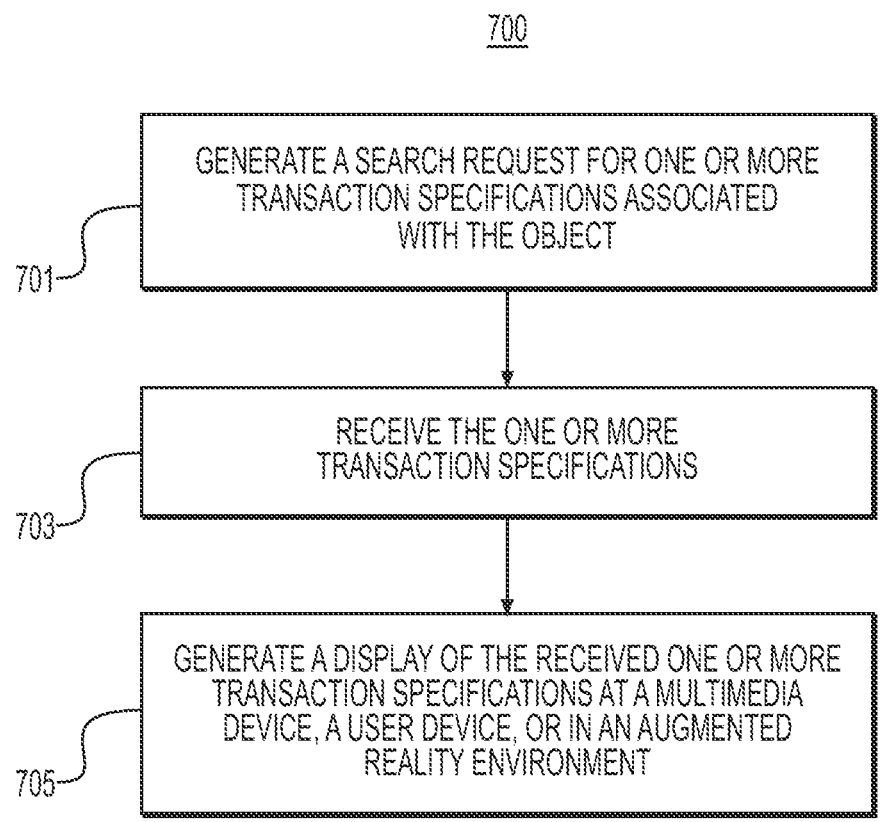
FIG. 7 is a flowchart of an exemplary method of generating a transaction or payment interface involving a virtual object from an AR environment, according to one aspect of the present disclosure.
Figure 8:
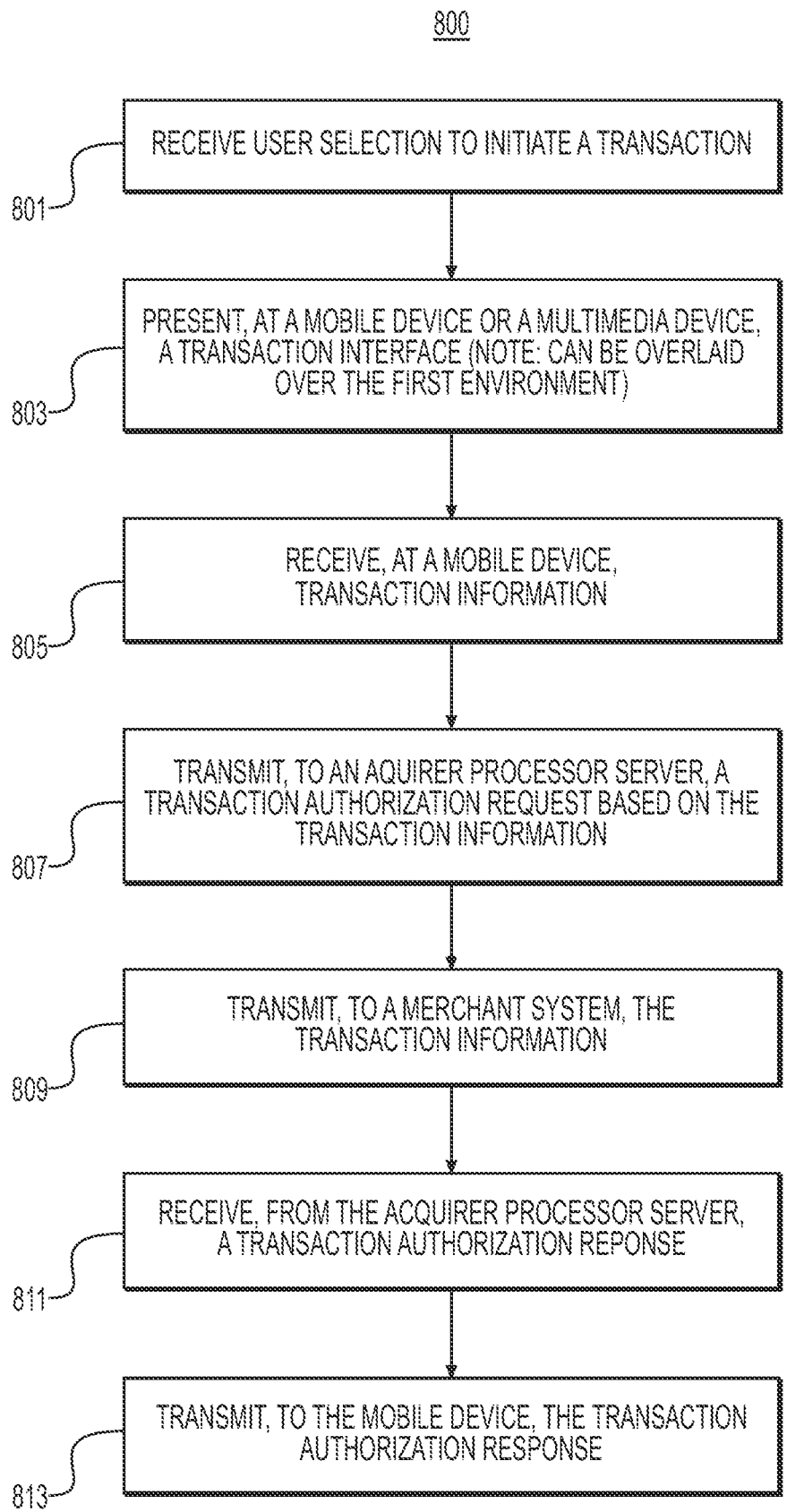
FIG. 8 is a flowchart of an exemplary method of processing a transaction associated with a virtual object from an AR environment, according to one aspect of the present disclosure.

FIGS. 7 and 8 depict exemplary methods for completing transactions associated with displayed virtual objects. For example, FIG. 7 describes one method of generating a display of transaction specifications for a user to select. FIG. 8 describes a method of approving payment and completing a purchase transaction associated with a virtual object.

FIG. 5A is a flowchart of an exemplary method 500 of enabling electronic transactions and presentation of virtual objects across disparate devices, according to one aspect of the present disclosure. Method 500 may be performed by the content retrieval platform 135 or by a user device 130. In one embodiment, step 501 may include detecting, in an augmented reality environment, a virtual object. The augmented reality environment may be displayed using a first device, e.g., a mobile phone of a user. Step 503 may include detecting a multimedia device. In one embodiment of step 503, the multimedia device may be within the augmented reality environment displayed using the first device. For example, the augmented reality environment may include physical objects captured by imaging capabilities of the first device, as well as, virtual objects created as virtual features of the augmented reality environment. The multimedia device may comprise a physical, tangible device captured by the imaging capabilities of the first device. As previously discussed, the multimedia device may comprise a television set, or any other consumer media device with a visual interface. The multimedia device may comprise a second device, different from the first device.

Alternately or in addition, step 503 may include detecting a network (e.g., network 160) connected to the first device, and identifying a multimedia device connected to the same network. Step 503 may further include establishing a connection, pairing, or link between the first device and the multimedia device, e.g., via a Bluetooth™, WiFi™, Zigbee™, wireless, Near Field Communication (NFC), radio frequency communication, or any other connection possible between two devices.

Step 505 may include prompting a first display of the virtual object at the detected multimedia device. For example, step 505 may include generating, at the second device, a display comprising a representation of the virtual object from the augmented reality environment. In some cases, step 505 may include detecting a user selection and prompting the display of the virtual object on the multimedia device in response to the user selection. The user selection may include a voice command, or a gesture, e.g., a swiping, clicking, double-clicking, touching, grabbing, or pinching motion across a depiction of the virtual object in the augmented reality environment. Display of the virtual object at the multimedia device may be generated in response to the user selection. Step 505 may also include displaying the augmented reality environment on a mobile device (first device) separate from the multimedia device. In one embodiment, the virtual object may be displayed simultaneously at a mobile device and at the multimedia device, sequentially displayed at the mobile device and at the multimedia device, or displayed only on the multimedia device once the display of the virtual object at the multimedia device is initiated.

Step 505 may also include prompting a display of at least a portion of the augmented reality environment of the multimedia device. For example, the augmented reality environment may initially be displayed on an interface of a user device, e.g., a mobile device. Upon initiating a display of the virtual object of the user device augmented reality environment onto a multimedia device, step 505 may further include prompting a display of at least a portion of the augmented reality environment onto the multimedia device as well. Such a depiction may provide a visual context of visual aid of the virtual object, on the multimedia device. In some cases, the portion of the augmented reality environment may include background scenic features of the environment, or user prompts. User prompts may include prompts for payment or transaction authentication. FIG. 7 discusses payment prompts in more detail.

Step 507 may include receiving user input comprising an interaction with the virtual object. The user input may be received via a mobile device, e.g., the mobile device displaying the augmented reality environment. User input may also be received via a controller associated with the multimedia device. Exemplary user input may include a selection to rotate, zoom in, zoom out, change color, change dimensions of the virtual object, purchase the object, view items related to the object, display the object with one or more other objects, or a combination thereof. Step 509 may include prompting an updated display of the virtual object at the multimedia device. The updated display may comprise a zoomed in, zoomed out, color variation, or geometrically modified view of the virtual object.

FIG. 5B is a flowchart of an exemplary method 520 of displaying a virtual object from an augmented reality environment, according to one aspect of the present disclosure. Method 520 may be performed by the content retrieval platform 135 or by a multimedia device 140. Step 521 may include receiving, at a multimedia device, a prompt to display a virtual object from an augmented reality environment. The virtual object and augmented reality environment may be displayed using a first device, e.g., a mobile device. The prompt may be received from a mobile device or a mobile device in connection with a content retrieval platform 135. For example, step 521 may include detecting an electronic network and detecting a mobile device connected to the electronic network. The prompt to display the virtual object may be conveyed via the electronic network by the detected mobile device. In some embodiments, step 521 may include receiving the prompt directly at the multimedia device. In other embodiments, step 521 may include receiving the prompt and then detecting a physical multimedia device.

Step 523 may include generating, at the multimedia device, a first display of the virtual object. Step 525 may include receiving one or more commands including an updated view of the virtual object. The commands may be received from the detected mobile device. Alternately or in addition, the commands may be received from a controller, a mobile device, a voice command, a gesture, or a combination thereof. To facilitate receipt of the commands, some embodiments of step 525 may include generating a view control menu including options for a user to swipe, click, double-click, touch, grab, or pinch the first display of the virtual object, and/or generating a prompt for the user to provide a voice command.

Step 527 may include generating a display of the updated view of the virtual object. For example, the display of the updated view of step 527 may be generated based on a user response to a generated view control menu. The display of the virtual object may be accompanied by a payment interface for purchase of the virtual object.

FIG. 6 is a flowchart of an exemplary method 600 of displaying a virtual object from an augmented reality environment, according to one aspect of the present disclosure. Method 600 may be performed by the content retrieval platform 135. Step 601 may include identifying one or more virtual objects in an augmented reality environment. In some embodiments, the content retrieval platform 135 may include or operate as a virtual reality or augmented reality content platform, providing the virtual environment accessible by a user. In such a case, step 601 may include differentiating between virtual objects in a virtual or augmented reality setting, versus background displays. For example, virtual objects in an augmented reality display of a room may include a couch, a lamp, or a table. The background display may include the walls of the room. As another example, virtual objects in an augmented reality environment depicting a forest may include virtual objects, e.g., camping gear, a lantern, or food supplies, and the background may include a depiction or captured imagery of a campsite.

Step 603 may include determining, for each of the identified virtual objects, an object identifier. The object identifier may be specific to the object, e.g., the couch, lamp, table, camping gear, lantern, or food item. Step 605 may include retrieving, based on the object identifier, a stored representation of the virtual object. The stored representation may include a 3D model, a 2D image, a schematic diagram, a photographic image, an icon, or any stored depiction of the virtual object. The stored representation may be a representation stored in a database maintained by the content retrieval platform 135, or any data storage entity accessible by content retrieval platform 135. For example, merchant system 150 may maintain a database of representations of objects that may be shown in the augmented reality environment. Merchant system 150 may also tag each of the representations using the object identifier, so that the representations may be retrieved in step 605. Multiple merchant systems or data storage entities may contribute to the virtual objects that may be displayed in an augmented reality environment. A single augmented reality environment may include or display virtual objects from one or more merchant systems or data storage entities. In some embodiments, the representations may be updated by the merchant system 150 or data storage entities. In such cases, step 605 may include determining multiple different representations for a single virtual item, or retrieving different representations of the same virtual object at different times.

Step 607 may include detecting a multimedia device and casting the retrieved representation of the virtual object to the detected multimedia device. For example, a 3D model of a couch may be retrieved from a furniture merchant system, based on the object identifier of a virtual version of the couch in an augmented reality environment displayed on a user's mobile phone. The 3D model of the couch may then be cast to a user's television.

FIG. 7 is a flowchart of an exemplary method 700 of displaying a transaction interface involving the virtual object from an augmented reality environment, according to one aspect of the present disclosure. Method 700 may be performed by the content retrieval platform 135, in conjunction with user device 130 and/or multimedia device 140. In one embodiment, step 701 may include generating a search request for one or more transaction specifications associated with the virtual object (e.g., from method 600). The search request may include an identifier associated with the virtual object.

Step 703 may include receiving, from a server, transaction specifications associated with the identifier from the search request. The server may include a second content platform or a server operating/accessing AR content storage 244. Exemplary transaction specifications may include object specification, weight, price, delivery information, promotional code(s), user review(s), image(s) of the object, size information, use information, material composition, nutritional information, dosage, serving size, ingredient information, warnings, warranty information, or a combination thereof.

Step 705 may include generating a display comprising the received transaction specifications. The display may include a depiction of the virtual object. For example, the display may include a payment interface and step 705 may be used to perform, at the user device, multimedia device, or augmented reality environments, payment authentication for a purchase of or related to the virtual object. Step 705 may also include storing the depiction of the object as a virtual object file as part of the user's file history. The user may access this file history and virtual object at a later time, either via a user device or multimedia device. Exemplary steps of completing a payment transaction using the display of transaction specifications is described in FIG. 8.

FIG. 8 is a flowchart of an exemplary method of 800 of conducting a payment transaction for a selected virtual object from an augmented reality environment or display, according to one aspect of the present disclosure. Step 801 may include receiving a user selection to initiate a transaction associated with an object from a multimedia stream. Step 803 may include presenting, at a user device or at a multimedia device, a transaction interface. The user device may comprise a personal mobile device and the multimedia device may comprise a monitor or television set. The transaction interface may include purchase information related to the object, including, product specifications (e.g., size, quantity, dimensions, etc.), user reviews, price, shipping information and cost, related objects, etc. The transaction interface may also include menu of options for payment, e.g., a list of payment vehicles related to a user device or multimedia device, including credit card, bank, or app-based credit accounts. The transaction interface may be overlaid or superimposed on a display of the user device or multimedia device (e.g., as shown by transaction interface 410c in FIG. 4C and transaction interface 415c in in FIG. 4D).

Step 805 may include receiving, at a user device (or via a multimedia device), transaction information, e.g., payment credentials and/or user input indicating a desire to purchase the object. Step 805 may also include retrieving previously-generated or stored user account information, or requesting that a user enter payment information. For example, AR application 234 may work in conjunction with a payment vehicle application 236 to present the transaction interface. The transaction interface may allow the user to confirm/modify the displayed transaction information and make an electronic payment.

Step 807 may include transmitting, to an acquirer processor server (e.g., acquirer processor server(s) 115), a transaction authorization request based on the received transaction information. The transaction authorization request may be generated based on the transaction information received, e.g., from the user device 130. The transaction authorization request may comprise information needed by downstream entities (e.g., acquirer processor server 115, payment network 120, financial institution 125) to route and/or authorize the transaction. At step 809, the transaction information may be transmitted to a merchant system (i.e., merchant system 150 in FIG. 1). This step may be performed to confirm inventory of the object or to check whether the merchant system has any particular payment credential/security checks, loyalty programs, promotions/price reductions, etc.

Step 811 may include receiving a transaction authorization response, e.g., from a merchant system 150 or an acquirer processor server 115. At step 813, the transaction authorization response may be transmitted to the user device 130 to complete a transaction. For example, the user device 130 may receive the transaction authorization response and complete the purchase by prompting payment within the payment environment 110. Completion of a transaction in this context may include providing payment for purchasing an object. The transaction authorization response may authorize payment transfer from the user's accounts (and financial institution(s) 125) to a merchant system (e.g., merchant system 150).

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 9 illustrates an implementation of a general computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 can be implemented using electronic devices that provide voice, video, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 904 includes a cache or random-access memory for the processor 902. In alternative implementations, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 900 may further include a display unit 910, such as a liquid crystal display (LCD), an organic light emitting diode (OLED), a flat panel display, a solid-state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 906.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control, or any other device operative to interact with the computer system 900.

The computer system 900 may also or alternatively include a disk or optical drive unit 906. The disk drive unit 906 may include a computer-readable medium 922 in which one or more sets of instructions 924, e.g. software, can be embedded. Further, the instructions 924 may embody one or more of the methods or logic as described herein. The instructions 924 may reside completely or partially within the memory 904 and/or within the processor 902 during execution by the computer system 800. The memory 904 and the processor 902 also may include computer-readable media as discussed above.

In some systems, a computer-readable medium 922 includes instructions 924 or receives and executes instructions 924 responsive to a propagated signal so that a device connected to a network 160 can communicate voice, video, audio, images, or any other data over the network 160. Further, the instructions 924 may be transmitted or received over the network 160 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 160, external media, the display 910, or any other components in system 900, or combinations thereof. The connection with the network 160 may be a physical connection, such as a wired Ethernet connection or may be established wirelessly as discussed below. Likewise, the additional connections with other components of the system 900 may be physical connections or may be established wirelessly. The network 160 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random-access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 160. The network 160 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 160 may include wide area networks (WAN), such as the Internet, local area networks (LAN), campus area networks, metropolitan area networks, a direct connection such as through a Universal Serial Bus (USB) port, or any other networks that may allow for data communication. The network 160 may be configured to couple one computing device to another computing device to enable communication of data between the devices. The network 160 may generally be enabled to employ any form of machine-readable media for communicating information from one device to another. The network 160 may include communication methods by which information may travel between computing devices. The network 160 may be divided into sub-networks. The sub-networks may allow access to all of the other components connected thereto or the sub-networks may restrict access between the components. The network 160 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The embodiments herein allow for augmented reality interfaces to be displayed on physical consumer devices, e.g., television sets and monitors. Such experiences increase fluidity between augmented reality environments and physical environments. For example, the various display options allow for augmented reality experiences to be shared between users. As another example, the ability display and manipulate objects on a multimedia device (and larger screen) may facilitate user interaction with virtual objects from augmented reality environments. In addition, the disclosed embodiments increase the functionality and uses of multimedia devices that may already exist in a user's physical environment. The present embodiments decrease the limitations of augmented reality in being bound to personal devices/environments and increase possible user/group interactions with virtual objects.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for displaying a virtual object in an augmented reality environment and a real environment, comprising:
    generating, by an augmented reality application in a first device, a presentation of the virtual object and a second device within the augmented reality environment;
    establishing a network connection between the first device and the second device;
    generating a presentation of the virtual object in the second device, wherein the second device is a multimedia device in the real environment, and wherein the presentation includes a shared display inside and outside of the augmented reality environment; and
    generating a transaction interface in the first device, the second device, or a combination thereof to initiate a transaction of the virtual object, wherein the transaction interface is superimposed over the augmented reality environment in the first device and the presentation in the second device.

2. The computer-implemented method of claim 1, further comprising:
    receiving a selection of the virtual object from one or more user interface elements of the transaction interface; and
    generating a search request for a transaction information of the selected virtual object based, at least in part, on the selection, wherein the search request includes an identifier associated with the selected virtual object.

3. The computer-implemented method of claim 2, further comprising:
    receiving the transaction information associated with the identifier from a user library, wherein a data stored in the user library is in sync with the first device, the second device, or a combination thereof;
    generating a presentation of the transaction information in the transaction interface of the first device, the second device, or a combination thereof; and
    transmitting a transaction authorization request based, at least in part, on the transaction information, wherein the transaction authorization request includes payment authentication information, user credentials, or a combination thereof.

4. The computer-implemented method of claim 1, wherein the virtual object is displayed simultaneously in the first device and the second device or sequentially in the first device and the second device.

5. The computer-implemented method of claim 1, further comprising:
    differentiating the virtual object from one or more background displays in the augmented reality environment;
    determining an identifier for the virtual object;
    retrieving a stored representation of the virtual object from a user library based, at least in part, on the identifier; and
    casting the stored representation of the virtual object to the first device, the second device, or a combination thereof, wherein the casting is based on establishing a connection via a near field communication.

6. The computer-implemented method of claim 1, further comprising:
    pairing a user interface of the first device with a user interface of the second device, wherein a screen command for a specific action in the user interface of the first device prompts a reciprocal action in the user interface of the second device.

7. The computer-implemented method of claim 1, further comprising:
    presenting at least one feature of the augmented reality environment in the first device and at least one other feature of the augmented reality environment in the second device, wherein a user interface element for selecting the virtual object is presented in the first device, and wherein a background scenic features of the augmented reality environment is presented in the second device.

8. The computer-implemented method of claim 1, further comprising:
    generating a presentation of a user history menu within the augmented reality environment of the first device, the interface of the second device, or a combination thereof, wherein the user history menu indicates previously purchased items by a user; and
    receiving a request to search the user history menu to determine whether the selected virtual object has been previously purchased by the user.

9. The computer-implemented of claim 1, further comprising:
    selecting the virtual object for display at the second device by framing the second device within a frame of the first device; and
    tapping the virtual object.

10. The computer-implemented of claim 1, wherein the presentation include modifications to the virtual object, and wherein the modifications include truncating, cropping, replicating portions, inserting features, or a combination thereof.

11. A system for displaying a virtual object in an augmented reality environment and a real environment, comprising:
    generating, by an augmented reality application in a first device, a presentation of the virtual object and a second device within the augmented reality environment;
    establishing a network connection between the first device and the second device;
    generating a presentation of the virtual object in the second device, wherein the second device is a multimedia device in the real environment, and wherein the presentation includes a shared display inside and outside of the augmented reality environment; and generating a transaction interface in the first device, the second device, or a combination thereof to initiate a transaction of the virtual object, wherein the transaction interface is superimposed over the augmented reality environment in the first device and the presentation in the second device.

12. The system of claim 11, further comprising:
receiving a selection of the virtual object from one or more user interface elements of the transaction interface; and
generating a search request for a transaction information of the selected virtual object based, at least in part, on the selection, wherein the search request includes an identifier associated with the selected virtual object.

13. The system of claim 12, further comprising:
receiving the transaction information associated with the identifier from a user library, wherein a data stored in the user library is in sync with the first device, the second device, or a combination thereof;
generating a presentation of the transaction information in the transaction interface of the first device, the second device, or a combination thereof; and
transmitting a transaction authorization request based, at least in part, on the transaction information, wherein the transaction authorization request includes payment authentication information, user credentials, or a combination thereof.

14. The system of claim 11, wherein the virtual object is displayed simultaneously in the first device and the second device or sequentially in the first device and the second device.

15. The system of claim 11, further comprising:
differentiating the virtual object from one or more background displays in the augmented reality environment;
determining an identifier for the virtual object;
retrieving a stored representation of the virtual object from a user library based, at least in part, on the identifier; and
casting the stored representation of the virtual object to the first device, the second device, or a combination thereof, wherein the casting is based on establishing a connection via a near field communication.

16. The system of claim 11, further comprising:
pairing a user interface of the first device with a user interface of the second device, wherein a screen command for a specific action in the user interface of the first device prompts a reciprocal action in the user interface of the second device.

17. The system of claim 11, further comprising:
presenting at least one feature of the augmented reality environment in the first device and at least one other feature of the augmented reality environment in the second device, wherein a user interface element for selecting the virtual object is presented in the first device, and wherein a background scenic features of the augmented reality environment is presented in the second device.

18. An apparatus for displaying a virtual object in an augmented reality environment and a real environment, comprising:
at least one processor; and
at least one memory including computer program code for one or more programs,
the at least one memory and the computer program code configured to, with the at least one processor, cause the apparatus to perform at least the following,
generate, by an augmented reality application in a first device, a presentation of the virtual object and a second device within the augmented reality environment;
establish a network connection between the first device and the second device;
generate a presentation of the virtual object in the second device, wherein the second device is a multimedia device in the real environment, and wherein the presentation includes a shared display inside and outside of the augmented reality environment; and
generate a transaction interface in the first device, the second device, or a combination thereof to initiate a transaction of the virtual object, wherein the transaction interface is superimposed over the augmented reality environment in the first device and the presentation in the second device.

19. The apparatus of claim 18, further comprising:
receive a selection of the virtual object from one or more user interface elements of the transaction interface; and
generate a search request for a transaction information of the selected virtual object based, at least in part, on the selection, wherein the search request includes an identifier associated with the selected virtual object.

20. The apparatus of claim 19, further comprising:
receive the transaction information associated with the identifier from a user library, wherein a data stored in the user library is in sync with the first device, the second device, or a combination thereof;
generate a presentation of the transaction information in the transaction interface of the first device, the second device, or a combination thereof; and
transmit a transaction authorization request based, at least in part, on the transaction information, wherein the transaction authorization request includes payment authentication information, user credentials, or a combination thereof.

* * * * *

UNITED STATES PATENT AND TRADEMARK OFFICE
CERTIFICATE OF CORRECTION

| | | |
|---|---|---|
| PATENT NO. | : 11,580,714 B2 | Page 1 of 1 |
| APPLICATION NO. | : 17/557896 | |
| DATED | : February 14, 2023 | |
| INVENTOR(S) | : Kevin Gordon and Charlotte Spender | |

It is certified that error appears in the above-identified patent and that said Letters Patent is hereby corrected as shown below:

In the Claims

In Column 24, Claim 9, Line 44, after "computer-implemented" insert --method--

In Column 24, Claim 10, Line 50, after "computer-implemented" insert --method--

Signed and Sealed this
Second Day of April, 2024

*Katherine Kelly Vidal*

Katherine Kelly Vidal
*Director of the United States Patent and Trademark Office*